US010504062B2

(12) United States Patent
 Wilson

(10) Patent No.: US 10,504,062 B2
(45) Date of Patent: Dec. 10, 2019

(54) DISASTER MITIGATION AND RECOVERY SYSTEM AND METHOD

(71) Applicant: Mike Wilson, Clarksville, TN (US)

(72) Inventor: Mike Wilson, Clarksville, TN (US)

( * ) Notice: Subject to any disclaimer, the term of this patent is extended or adjusted under 35 U.S.C. 154(b) by 109 days.

(21) Appl. No.: 14/166,406

(22) Filed: Jan. 28, 2014

(65) Prior Publication Data

US 2014/0214485 A1 Jul. 31, 2014

Related U.S. Application Data

(60) Provisional application No. 61/757,494, filed on Jan. 28, 2013.

(51) Int. Cl.
 *G06Q 10/10* (2012.01)
 *G06Q 10/06* (2012.01)

(52) U.S. Cl.
 CPC ....... *G06Q 10/10* (2013.01); *G06Q 10/06315* (2013.01)

(58) Field of Classification Search
 CPC ............. G06Q 10/10; G06Q 10/06315; G06Q 10/0631; G06Q 10/0635
 See application file for complete search history.

(56) References Cited

U.S. PATENT DOCUMENTS

| | | | | |
|---|---|---|---|---|
| 2002/0116254 A1* | 8/2002 | Stein | ..................... | G06Q 50/163 705/314 |
| 2002/0143469 A1* | 10/2002 | Alexander | ............. | A62B 99/00 702/2 |
| 2003/0191606 A1* | 10/2003 | Fujiyama | ............... | G06Q 10/06 702/185 |
| 2004/0044553 A1* | 3/2004 | Lambert | ................. | A62B 99/00 702/2 |
| 2004/0128613 A1* | 7/2004 | Sinisi | ..................... | G06Q 10/00 715/203 |
| 2004/0243229 A1* | 12/2004 | Vidlund | ........... | A61B 17/00234 623/2.34 |

(Continued)

FOREIGN PATENT DOCUMENTS

WO WO-2013188762 A1 * 12/2013 ............. G01S 19/17

OTHER PUBLICATIONS

"Crowdsourcing earthquake damage assessment using remote sensing imagery," by Luke Barrington, et al., published by "Annals of Geophysics: Citizen Empowered Seismology" 54, 6; accepted Oct. 20, 2011.*

(Continued)

*Primary Examiner* — Tyler W Knox
(74) *Attorney, Agent, or Firm* — Wayne Edward Ramage; Baker Donelson

(57) ABSTRACT

A computer-based system where mobile computing devices, including, but not limited to, cell phones, smart phones, tablet computers, netbook and notebook computers, and laptop computers, are used in the field to map and record individual damage assessments of a possible disaster area. GPS technology may be used in conjunction with local databases and mapping programs to map specific locations and associate location data with assessments. The assessments are reported through a data network to an administrative application, which may reside on one or more computing devices, tablet computers, or network servers.

7 Claims, 7 Drawing Sheets

(56) References Cited

U.S. PATENT DOCUMENTS

| | | | |
|---|---|---|---|
| 2005/0060179 A1* | 3/2005 | Tinberg | G06Q 10/10 705/306 |
| 2005/0171952 A1* | 8/2005 | Gray | G06Q 99/00 |
| 2006/0041406 A1* | 2/2006 | Porter | G06Q 10/063 703/2 |
| 2006/0112166 A1* | 5/2006 | Pettigrew | G06Q 10/107 709/206 |
| 2006/0235741 A1* | 10/2006 | Deaton | G01C 15/00 705/7.13 |
| 2007/0204187 A1* | 8/2007 | DeMarco | G06Q 10/10 714/15 |
| 2008/0041948 A1* | 2/2008 | Mayers | G06Q 10/08 235/385 |
| 2008/0097796 A1* | 4/2008 | Birchall | G06Q 10/087 705/4 |
| 2008/0139165 A1* | 6/2008 | Gage | H04W 4/90 455/404.1 |
| 2009/0024543 A1* | 1/2009 | Horowitz | G06Q 30/0283 705/400 |
| 2009/0055329 A1* | 2/2009 | Catania | G06Q 10/087 705/400 |
| 2009/0143045 A1* | 6/2009 | Graves | A61B 5/02055 455/404.1 |
| 2009/0254572 A1* | 10/2009 | Redlich | G06Q 10/06 |
| 2010/0010968 A1* | 1/2010 | Redlich | G06Q 10/00 707/E17.014 |
| 2010/0250289 A1* | 9/2010 | Weaver | G06Q 10/087 705/4 |
| 2010/0250497 A1* | 9/2010 | Redlich | F41H 13/00 707/661 |
| 2011/0130636 A1* | 6/2011 | Daniel | G08B 25/016 600/301 |
| 2011/0270767 A1* | 11/2011 | Hamilton | G06Q 10/067 705/301 |
| 2012/0065944 A1* | 3/2012 | Nielsen | G06Q 10/103 703/1 |
| 2012/0100825 A1* | 4/2012 | Sherman | H04W 4/029 455/404.2 |
| 2012/0109690 A1* | 5/2012 | Weinrauch | G06Q 10/10 705/4 |
| 2012/0130753 A1* | 5/2012 | Lewis | G01S 19/17 705/4 |
| 2012/0179431 A1* | 7/2012 | Labrie | G06F 17/5004 703/1 |
| 2012/0185260 A1* | 7/2012 | Perez | G06Q 10/087 705/1.1 |
| 2012/0265867 A1* | 10/2012 | Boucher | H04W 4/90 709/223 |
| 2012/0311053 A1* | 12/2012 | Labrie | G06F 17/5004 709/206 |
| 2012/0315877 A1* | 12/2012 | Lewis | H04W 4/08 455/411 |
| 2012/0316913 A1* | 12/2012 | Reyes | G06Q 10/0635 705/7.23 |
| 2013/0006674 A1* | 1/2013 | Bowne | G06Q 10/0639 705/4 |
| 2014/0214485 A1* | 7/2014 | Wilson | G06Q 10/10 705/7.29 |

OTHER PUBLICATIONS

"Residential building damage from hurricane storm surge: proposed methodologies to describe, assess and model building damage ," by Carol J. Friedland, published by Louisiana State University, 2009.*

* cited by examiner

Individual Damage Assessment

Report ID _____  County _____  Event Title _____  Date 482012-10524  Assessor _____

Address 20
GPS
Lat: _____
Lng: _____
USNG _____

Owner/Occupants 30
☐ Owner  ☐ Renter
Name _____
In Household _____
POC
Phone _____
Phone _____

Insurance 40
☐ Structure
☐ Personal Property
☐ Flood
☐ Renter
☐ No Insurance
☐ Unknown Immediate Needs 90
☐ Food/Water
☐ Special Needs
☐ Shelter
☐ Transportation
☐ Medicine
☐ None at Time of Assessment Additional Remarks 80
_____

Exterior Type 50
BRICK
# of Floors  0
Building Purpose
Single Family Home
# of Employees  0

Type of Damage 60
☐ Flood
☐ Wind
☐ E-Quake
☐ Collapse
☐ Tornado
☐ Other
☐ Winter Storm
☐ Suspected Terrorism Damage Category 70
Affected Habitable
Select Percentage
0
Flood SubDamage _____

Building Assessment  Assessed Values
Amount of Damage _____  _____

Additional Resources/Follow Up
_____

☐ Low Income
☐ Flag for further review

Save    Create PDF 96

FIG. 1

Public Damage Assessment Site Estimate

| County | Name of Applicant | Name of Local Contact | | Phone Number |
|---|---|---|---|---|

Select Applicant: 110

| County | Applicant Name | POC Name | POC Phone | Applicant ID |
|---|---|---|---|---|
| Montgomery | Chris | sam | 123-654-4528 | 1-1096 |
| Montgomery | public entity 1111 | local contact 1111 | 145-263-1452 | 1-1092 |
| Referred | Forced | Ffdxdx | Forced | 1-1031 |
| Montgomery | Hkgffjytd | Tgfifryfr | Referred | 1-1020 |
| Montgomery | public entity 1 | chris | 147-258-0369 | 1-1016 |

Select Key For Damage Category

Select Cost Code 130  Location

☐ 1 DEBRIS REMOVAL 120
☐ 2 PROTECTIVE MEASURES   Enter Number of Units   Description of Damage
☐ 3 ROADS AND BRIDGES
☐ 4 WATER CONTROL FACILITIES   Site Name   Impact
☐ 5 PUBLIC BUILDINGS
☐ 6 PUBLIC UTILITIES   % Complete
☐ 7 FACILITIES UNDER CONSTRUCTION
☐ 8 PRIVATE NON-PROFIT   Cost Estimate:   Cost Estimate:
☐ 9 PUBLIC RECREATION
   Calculate Estimate   140

---

Applicants | Add Applicant | Save

Date 112
08/29/2012

County

Public Entity

Name of Local Contact

FIG. 2

Residential Summary

Event: testevent

Local Government Damage Assessment Summary

Residential Insured

| | Destroyed | Major | Minor | Affected | Inaccessible |
|---|---|---|---|---|---|
| Owner Occupied Single Family Homes | 1 | 1 | | 2 | |
| Owner Occupied Mobile Homes | | | | | 1 |
| Rentals-House, MHs, Apt. Units, etc. | | | | 1 | |
| Secondary Residence | | | | | |
| Insured Totals | 1 | 1 | | 3 | 1 |
| Assessment Totals | 15,800 | 7,900 | | 19,690 | 0 |

Assessed Damage: $205,100

Residential Uninsured

| | Destroyed | Major | Minor | Affected | Inaccessible |
|---|---|---|---|---|---|
| Owner Occupied Single Family Homes | | | | 2 | |
| Owner Occupied Mobile Homes | | | | | |
| Rentals-House, MHs, Apt. Units, etc. | 1 | 1 | | | |
| Secondary Residence | | | | | |
| Uninsured Totals | 1 | 1 | | 2 | |
| Assessment Totals | 86,800 | 0 | | 11,960 | |
| Insurance Unknown Assessment Totals | 43,100 | 18,850 | | 1,010 | |

Grand Totals

| Destroyed | Major | Minor | Affected | Inaccessible |
|---|---|---|---|---|
| 3 | 3 | | 6 | 1 |

[Create PDF] [Refresh]

FIG. 3

Commercial Summary

Event: testevent

Local Government Damage Assessment Summary

| | Commercial Insured | | | | Commercial Uninsured | | | |
|---|---|---|---|---|---|---|---|---|
| | Destroyed | Major | Minor | Affected | Inaccessible | Destroyed | Major | Minor | Affected | Inaccessible |
| Commercial | 2 | 2 | 6 | 1 | 1 | | | | | |
| Industrial | | | | | | | | | | |
| Utilities | 1 | | | | | | | | | |
| Transportation | | | | | | | | | | |
| Insured Totals | 3 | 2 | 7 | 1 | 1 | | | | | |
| Owner Occupied Single Family Homes | | | | | | | | | | |
| Owner Occupied Mobile Homes | | | | | | | | | | |
| Rentals-House, MHs, Apt. Units, etc. | | | | | | | | | | |
| Secondary Residence | | | | | | | | 1 | | |
| Uninsured Totals | | | | | | | | 2 | | |
| Assessment Totals | 427,800 | 0 | 377,475 | 71,390 | 0 | | | 108,300 | | |
| Insurance Unknown Assessment Totals | | | | | | 1 | 1 | | 1 | |
| | | | | Assessed Damage | $1,009,145 | 255,500 | 14,500 | 9,680 | | |

Grand Totals

| Destroyed | Major | Minor | Affected | Inaccessible |
|---|---|---|---|---|
| 3 | 3 | 9 | 2 | 1 |

Create PDF    Refresh

FIG. 4

Public Building Summary

Event: testevent

Local Government Damage Assessment Summary

Public Buildings Insured

| | Destroyed | Major | Minor | Affected | Inaccessible |
|---|---|---|---|---|---|
| County | 1 | 1 | 3 | 1 | |
| City | 2 | 1 | 2 | 3 | |
| State | | 1 | | | |
| Federal | 4 | 3 | 1 | 2 | |
| Educational/Charitable | 1 | 1 | 3 | 1 | 1 |
| Religious | | | | | |
| Medical | | | | | |
| Total Insured | 8 | 7 | 11 | 7 | 1 |
| Assessment Totals | 7,700 | 219,000 | 230,075 | 96,250 | 0 |

Totals do not include Property Assessor data with no building value

Assessed Value: $1,091,730

Public Buildings Uninsured

| | Destroyed | Major | Minor | Affected | Inaccessible |
|---|---|---|---|---|---|
| County | 1 | 1 | 2 | 1 | |
| City | | | 1 | | |
| State | | | | | |
| Federal | 5 | 2 | | 2 | |
| Educational/Charitable | 1 | 2 | | | |
| Religious | | | | | |
| Medical | | | | | |
| Total Insured | 7 | 5 | 3 | 3 | |
| Assessment Totals | 253,000 | 143,550 | 13,375 | 52,320 | |

Insurance Unknown
Assessment Totals: 0 | | 0 | 1 | 4 | 13,460

[Create PDF]  [Refresh]

Grand Totals

| Destroyed | Major | Minor | Affected | Inaccessible |
|---|---|---|---|---|
| 16 | 12 | 15 | 14 | 1 |

FIG. 5

Total Assessment Summary

150
Total Assessed

| | |
|---|---|
| Residential | 13 |
| Commercial | 16 |
| County | 12 |
| City | 10 |
| Federal | 21 |
| State | 1 |
| Religious | 0 |

160
Total Damage Amount

| | |
|---|---|
| Residential | $205,110 |
| Commercial | $722,690 |
| County | $101,850 |
| City | $350,925 |
| Federal | $432,450 |
| State | $0 |
| Religious | |

Total Assessed

| | |
|---|---|
| Educational/Charitable | 17 |
| Utility | 1 |
| Industrial | 1 |
| Transportation | 1 |
| Agricultural | 7 |
| Medical | 0 |
| Other | 2 |

Total Damage Amount

| | |
|---|---|
| Educational/Charitable | $206,505 |
| Utility | $255,500 |
| Industrial | $9,680 |
| Transportation | $21,275 |
| Agricultural | $62,000 |
| Medical | |
| Other | $33,500 |

TOTALS: 102  $2,401,485

Refresh

FIG. 6

SITREP Report

Local Government Situation Report (SITREP)

Refresh

TO: [ ]   COUNTY: [ ]   DATE/TIME SENT: [ ]   SITREP #: [ ]

Disaster Information

| Field | Phonetic | Damage #s |
|---|---|---|
| Type of Disaster: [ ] | ALPHA | N/A |
| Time of Occurrence: [ ] | BRAVO | N/A |
| Location (town/community) [ ] | CHARLIE | N/A |
| Fatalities: Confirmed [ ] Missing [ ] | DELTA | [ ] |
| No. Persons Hospitalized: [ ] | ECHO | [ ] |
| No. Persons Treated/Released: [ ] | FOXTROT | [ ] |
| No. Persons Evacuated: [ ] | GOLF | [ ] |
| No. Persons Sheltered: [ ] (list names of shelters in comment section) | HOTEL | [ ] |
| No. Private Homes Destroyed: [ ] | INDIA | [ ] |
| No. Private Homes Damaged: Affected [ ] Minor [ ] Major [ ] | JULIET | [ ] |
| No. Mobile Homes Destroyed: [ ] | KILO | [ ] |
| No. Mobile Homes Damaged: Affected [ ] Minor [ ] Major [ ] | LIMA | [ ] |

Disaster Information

| Field | Phonetic | Damage #s |
|---|---|---|
| No. of Public Bldgs Destroyed: [ ] | MIKE | [ ] |
| No. Public Buildings Damaged: Affected [ ] Minor [ ] Major [ ] | NOVEMBER | [ ] |
| No. Private Businesses Destroyed: [ ] | OSCAR | [ ] |
| No. Private Businesses Damaged: Affected [ ] Minor [ ] Major [ ] | PAPA | [ ] |
| Number of Bridges [ ] Closed: [ ] Reason: | QUEBEC | [ ] |
| Number of Roads [ ] Closed: [ ] Reason: | ROMEO | [ ] |
| No. Utilities Destroyed: [ ] No. Utilities Damaged: [ ] | SIERRA / TANGO | [ ] [ ] |
| Extent of Crop Acres Damaged or Destroyed or Farm Losses: [ ] | UNIFORM | [ ] |
| OTHER DAMAGES/COMMENTS: [ ] | | |

Prepared By: [ ]   Received By: [ ]   Date/Time Received: [ ]

FIG. 7

DISASTER MITIGATION AND RECOVERY SYSTEM AND METHOD

This application claims benefit of and priority to U.S. Provisional Application No. 61/757,494, filed Jan. 28, 2013, and is entitled to that filing date for priority. The specification, figures and complete disclosure of U.S. Provisional Application No. 61/757,494 are incorporated herein by specific reference for all purposes.

FIELD OF INVENTION

This invention relates to a system and method for disaster and other damage reporting, assessment and mitigation.

BACKGROUND OF THE INVENTION

In any emergency situation, efficient and timely data collection is a critical factor. Previously, data collection for use in making a disaster declaration and assessment is initially performed in person using paper documents and forms. This information typically is not available for later use in disaster recovery and mitigation efforts.

Accordingly, what is needed is a system that allows for faster disaster assessments and declarations, wherein the information collected in that process is retained and readily available for use in later recovery and mitigation efforts.

SUMMARY OF INVENTION

In various embodiments, the present invention comprises a computer-based system where mobile computing devices, including, but not limited to, cell phones, smart phones, tablet computers, netbook and notebook computers, and laptop computers, are used in the field to map and record individual damage assessments of a possible disaster area. GPS technology may be used in conjunction with local databases and mapping programs to map specific locations and associate location data with assessments. The assessments are reported through a data network to an administrative application, which may reside on one or more computing devices, tablet computers, or network servers.

In an exemplary embodiment, the system provides a Damage Assessment Site Estimate tool to give the user a means to record and estimate the cost of repair work for a location with damage. The system may base repair costs on commercial cost codes.

The administrative application automatically sorts all of the assessment reports and forms, and compiles one or more reports to be used for collective disaster assessment, without requiring constant input from the location Emergency Operating Center (EOC). In one example, the system provides a "SITREP" report, which is a summation of total community effects after a disaster, which is automatically created based upon the reports submitted. All information is stored and available for all actions related to the disaster.

The system of the present invention may also be used to record other emergency situations, such as traffic accidents, and maintain and display real-time updated views or maps of automobile accident, traffic jams, and similar events. The system also provides for text messaging or other forms of electronic communications between users in the field and administrative users.

In yet another embodiment, the system comprises an application or program for use on mobile devices that any person can use to report emergencies or non-emergency conditions (e.g., potholes, missing signs, etc.). Emergency reports would get directed to 911 first responders or other designated agencies. Non-emergency condition reports would be processed and directed to the appropriate governmental authority (at the appropriate level, e.g., city, county, state, federal, etc.). The GPS data associated with the report, and the type of condition in the report, allows the system to automatically determine the appropriate governmental authority that should be notified.

BRIEF DESCRIPTION OF THE DRAWINGS

FIG. 1 shows a view of an Individual Damage Assessment screen in accordance with an embodiment of the present invention.

FIG. 2 shows a view of a Damage Assessment Site Estimate screen in accordance with an embodiment of the present invention.

FIG. 3 shows a view of a Residential Damage Summary in accordance with an embodiment of the present invention.

FIG. 4 shows a view of a Commercial Damage Summary in accordance with an embodiment of the present invention.

FIG. 5 shows a view of a Public Building Damage Summary in accordance with an embodiment of the present invention.

FIG. 6 shows a view of a Total Assessment Damage Summary in accordance with an embodiment of the present invention.

FIG. 7 shows a view of a SITREP Report in accordance with an embodiment of the present invention.

DETAILED DESCRIPTION OF EXEMPLARY EMBODIMENTS

In various exemplary embodiments, the present invention comprises a computer-based system where mobile computing devices, including, but not limited to, cell phones, smart phones, tablet computers, netbook and notebook computers, and laptop computers, are used in the field to map and record individual damage assessments of a possible disaster area. GPS technology may be used in conjunction with local databases and mapping programs to map specific locations and associate location data with assessments. The assessments are reported through a data network to an administrative application, which may reside on one or more computing devices, tablet computers, or network servers.

FIG. 1 shows an example of an individual damage assessment input screen. The input includes general assessment information 10 (e.g., report identification, county, event title, date, and assessor identification), address or location information 20 (including information which can be obtained from GPS technology), owner/occupant and point of contact information 30, insurance information 40, house type 50, type of damage 60, damage categorization and percentage 70, building assessment and amount of damage 80, and any immediate needs for the owner or occupants 90. The user can flag the assessment for further review, save it, and also create a PDF 96 (or similar format) report.

FIG. 2 shows an example of a Damage Assessment Site Estimate tool, which gives the user a means to record and estimate the cost of repair work for a location with damage. The input includes selection of an applicant 110 (which may open up a separate window with applicant listings, or the option to add an applicant 112), damage category 120, cost code 130, and other similar information. The user selects the "Calculation Estimate" option 140 after the information is input to generate the cost estimate. The system may base repair costs on commercial cost codes.

The administrative application automatically sorts all of the assessment reports and forms, and compiles one or more reports to be used for collective disaster assessment, without requiring constant input from the location Emergency Operating Center (EOC). Examples of the residential, commercial, public building, and Total Assessment damage summaries are shown in FIGS. 3-6.

FIG. 3, for example, shows a local government damage assessment summary for residential insured and uninsured residences, broken down into categories. For each category (e.g., owner occupied single family homes), the number of each type of residence is given by amount of damage (e.g., destroyed, major, minor, affected, inaccessible). Damage assessment totals also may be shown.

FIG. 4 shows a similar summary for commercial insured and uninsured property. FIG. 5 shows a similar summary for public buildings.

FIG. 6 shows a total assessment summary. For each category (e.g., residential, commercial, county, city, federal, state, religious, educational/charitable, utility, industrial, transportation, agricultural, medical, and other), the total number of properties 150 and the total damage amount assessed 160 is given.

FIG. 7 shows an example of a situation report ("SITREP"), which is a summation of total community effects after a disaster. This may be automatically created based upon the reports submitted. FIG. 7 shows examples of the type of information available. All information is stored and available for all actions related to the disaster.

The system of the present invention may also be used to record other emergency situations, such as, but not limited to, traffic accidents and traffic jams, and to maintain and display real-time updated views or maps of automobile accident, traffic jams, and similar events.

In one exemplary embodiment, the system provides for text messaging or other forms of electronic communications between users in the field and administrative users.

In yet another embodiment, the system comprises an application or program for use on mobile devices that any person can use to report emergencies or non-emergency conditions (e.g., potholes, missing signs, etc.). Emergency reports would get directed to 911 first responders or other designated agencies. Non-emergency condition reports would be processed and directed to the appropriate governmental authority (at the appropriate level, e.g., city, county, state, federal, etc.). The GPS data associated with the report, and the type of condition in the report, allows the system to automatically determine the appropriate governmental authority that should be notified.

In order to provide a context for the various aspects of the invention, the following discussion provides a brief, general description of a suitable computing environment in which the various aspects of the present invention may be implemented. A computing system environment is one example of a suitable computing environment, but is not intended to suggest any limitation as to the scope of use or functionality of the invention. A computing environment may contain any one or combination of components discussed below, and may contain additional components, or some of the illustrated components may be absent. Various embodiments of the invention are operational with numerous general purpose or special purpose computing systems, environments or configurations. Examples of computing systems, environments, or configurations that may be suitable for use with various embodiments of the invention include, but are not limited to, personal computers, laptop computers, computer servers, computer notebooks, hand-held devices, microprocessor-based systems, multiprocessor systems, TV set-top boxes and devices, programmable consumer electronics, cell phones, personal digital assistants (PDAs), network PCs, minicomputers, mainframe computers, embedded systems, distributed computing environments, and the like.

Embodiments of the invention may be implemented in the form of computer-executable instructions, such as program code or program modules, being executed by a computer or computing device. Program code or modules may include programs, objections, components, data elements and structures, routines, subroutines, functions and the like. These are used to perform or implement particular tasks or functions. Embodiments of the invention also may be implemented in distributed computing environments. In such environments, tasks are performed by remote processing devices linked via a communications network or other data transmission medium, and data and program code or modules may be located in both local and remote computer storage media including memory storage devices.

In one embodiment, a computer system comprises multiple client devices in communication with at least one server device through or over a network. In various embodiments, the network may comprise the Internet, an intranet, Wide Area Network (WAN), or Local Area Network (LAN). It should be noted that many of the methods of the present invention are operable within a single computing device.

A client device may be any type of processor-based platform that is connected to a network and that interacts with one or more application programs. The client devices each comprise a computer-readable medium in the form of volatile and/or nonvolatile memory such as read only memory (ROM) and random access memory (RAM) in communication with a processor. The processor executes computer-executable program instructions stored in memory. Examples of such processors include, but are not limited to, microprocessors, ASICs, and the like.

Client devices may further comprise computer-readable media in communication with the processor, said media storing program code, modules and instructions that, when executed by the processor, cause the processor to execute the program and perform the steps described herein. Computer readable media can be any available media that can be accessed by computer or computing device and includes both volatile and nonvolatile media, and removable and non-removable media. Computer-readable media may further comprise computer storage media and communication media. Computer storage media comprises media for storage of information, such as computer readable instructions, data, data structures, or program code or modules. Examples of computer-readable media include, but are not limited to, any electronic, optical, magnetic, or other storage or transmission device, a floppy disk, hard disk drive, CD-ROM, DVD, magnetic disk, memory chip, ROM, RAM, EEPROM, flash memory or other memory technology, an ASIC, a configured processor, CDROM, DVD or other optical disk storage, magnetic cassettes, magnetic tape, magnetic disk storage or other magnetic storage devices, or any other medium from which a computer processor can read instructions or that can store desired information. Communication media comprises media that may transmit or carry instructions to a computer, including, but not limited to, a router, private or public network, wired network, direct wired connection, wireless network, other wireless media (such as acoustic, RF, infrared, or the like) or other transmission device or channel. This may include computer readable instructions, data structures, program modules or other data in a modulated data signal such as a carrier wave or other transport mechanism. Said transmission may be wired, wireless, or both. Combinations of any of the above should also be included within the scope of computer readable media. The instructions may comprise code from any computer-programming language, including, for example, C, C++, C#, Visual Basic, Java, and the like.

Components of a general purpose client or computing device may further include a system bus that connects various system components, including the memory and processor. A system bus may be any of several types of bus structures, including, but not limited to, a memory bus or memory controller, a peripheral bus, and a local bus using any of a variety of bus architectures. Such architectures include, but are not limited to, Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computing and client devices also may include a basic input/output system (BIOS), which contains the basic routines that help to transfer information between elements within a computer, such as during start-up. BIOS typically is stored in ROM. In contrast, RAM typically contains data or program code or modules that are accessible to or presently being operated on by processor, such as, but not limited to, the operating system, application program, and data.

Client devices also may comprise a variety of other internal or external components, such as a monitor or display, a keyboard, a mouse, a trackball, a pointing device, touch pad, microphone, joystick, satellite dish, scanner, a disk drive, a CD-ROM or DVD drive, or other input or output devices. These and other devices are typically connected to the processor through a user input interface coupled to the system bus, but may be connected by other interface and bus structures, such as a parallel port, serial port, game port or a universal serial bus (USB). A monitor or other type of display device is typically connected to the system bus via a video interface. In addition to the monitor, client devices may also include other peripheral output devices such as speakers and printer, which may be connected through an output peripheral interface.

Client devices may operate on any operating system capable of supporting an application of the type disclosed herein. Client devices also may support a browser or browser-enabled application. Examples of client devices include, but are not limited to, personal computers, laptop computers, personal digital assistants, computer notebooks, hand-held devices, cellular phones, mobile phones, smart phones, pagers, digital tablets, Internet appliances, and other processor-based devices. Users may communicate with each other, and with other systems, networks, and devices, over the network through the respective client devices.

Thus, it should be understood that the embodiments and examples described herein have been chosen and described in order to best illustrate the principles of the invention and its practical applications to thereby enable one of ordinary skill in the art to best utilize the invention in various embodiments and with various modifications as are suited for particular uses contemplated. Even though specific embodiments of this invention have been described, they are not to be taken as exhaustive. There are several variations that will be apparent to those skilled in the art.

What is claimed is:

1. A system for managing damage assessments in a disaster area, comprising:

at least one administrative server, wherein the administrative server is in electronic communication with a data storage medium comprising a trusted certificate stored thereon, and is adapted to register one or more mobile computing devices; and at least one or more mobile computing devices registered with the administrative server, wherein said at least one or more registered mobile computing devices each comprises a microprocessor or processor, wherein the microprocessor or processor is programmed to conduct individual damage assessments by:

prompting a user in the field to enter individual damage assessment input information for an individual site;

prompting the user to enter damage repair work information for the individual site;

automatically calculating an estimated damage repair cost for the individual site based on damage category, number of units, and commercial cost codes;

automatically determining the physical location for the individual site using a GPS unit in the mobile computing device;

receiving and storing, in a computer readable storage medium in the at least one mobile computing device, the individual damage assessment input information, damage repair work information, estimated damage repair cost, and physical location for the individual site; and transmitting the individual damage assessment input information, damage repair work information, estimated damage repair cost, and physical location through a data network to one or more administrative servers;

further wherein the one or more administrative servers comprise a server processor or microprocessor, wherein the server processor or microprocessor is programmed to perform collective disaster assessment by:

receiving said individual damage assessment input information, damage repair work information, estimated damage repair cost, and physical location through the data network for a plurality of locations from a plurality of mobile computing devices, and display a local government damage assessment comprising a residential insured section and a residential uninsured section, wherein each section comprises four residential types, each residential type comprising a listing of the number of residences for each of five damage classifications, the damage classifications including destroyed, major, minor, affected, and inaccessible.

2. The system of claim 1, further wherein said at least one administrative server further comprises a microprocessor or processor, wherein the microprocessor or processor is programmed to manage damage assessments by:

receiving one or more individual damage assessment reports from said at least one mobile computing device; and compiling the information from said one or more individual damage assessment reports.

3. The system of claim 2, further wherein the microprocessor or processor of the at least one administrative server is programmed to provide one or more reports for collective disaster assessment.

4. The system of claim 3, wherein the reports are provided without requiring constant input from the emergency operating center for the respective disaster.

5. The system of claim 1, wherein the mobile computing device is a cell phone or smart phone.

6. The system of claim 1, wherein the mobile computing device is a tablet or notebook computing device.

7. The system of claim 1, wherein the mobile computing device is a laptop computer.

* * * * *